United States Patent [19]

Yoshida

[11] 4,412,226
[45] Oct. 25, 1983

[54] INK-JET PRINTING METHOD
[75] Inventor: Kazutaka Yoshida, Kanagawa, Japan
[73] Assignee: Fuji Photo Film Co., Ltd., Kanagawa, Japan
[21] Appl. No.: 346,909
[22] Filed: Feb. 8, 1982
[30] Foreign Application Priority Data
  Feb. 6, 1981 [JP] Japan .................. 56-15657
[51] Int. Cl.³ ............................................ G01D 15/18
[52] U.S. Cl. ........................................ 346/1.1; 346/75
[58] Field of Search ........................... 346/1.1, 75, 140
[56] References Cited
U.S. PATENT DOCUMENTS

| | | | |
|---|---|---|---|
| 3,871,004 | 3/1975 | Rittberg | 346/140 PD X |
| 3,959,797 | 5/1976 | Jensen | 346/1.1 |
| 3,977,007 | 8/1976 | Berry et al. | 346/1.1 |
| 4,084,259 | 4/1978 | Cahill et al. | 364/900 |
| 4,115,788 | 9/1978 | Takano et al. | 346/75 |
| 4,231,048 | 10/1980 | Horike et al. | 346/140 PD |

*Primary Examiner*—Donald A. Griffin
*Attorney, Agent, or Firm*—Young & Thompson

[57] ABSTRACT

An ink-jet printing method for painting an image on a recording medium uses ink-jet heads equal in number to the least common multiple of numbers of rows or columns of two different sizes of dot matrices. The ink-jet heads are disposed in side-by-side arrangement so as to deposit ink dots on dot lines adjacent one another. When a dot matrix having m rows and k columns for a single picture element is selectively used, ink-jet heads are so classified into several sub-groups of m ink-jet heads as to deposit ink dots on several scanning lines each of which comprises m dot lines. On the other hand, if the ink-jet heads are classified into several sub-groups of n ink-jet heads each, then they deposit ink dots on several scanning lines each of which comprises n dot lines when a dot matrix having n rows and l columns for a single picture element is selectively used.

5 Claims, 7 Drawing Figures

| DENSITY LEVEL | 1 | 2 | 3 | 4 | 5 | 6 | 7 | 8 |
|---|---|---|---|---|---|---|---|---|
| DOT MATRIX TABLE | ☐☐/☐☐ | ☐1/☐☐ | ☐3/☐☐ | ☐5/☐☐ | 7☐/☐☐ | 7☐/2☐ | 7☐/4☐ | 7☐/6☐ |

| DENSITY LEVEL | 9 | 10 | 11 | 12 | 13 | 14 | 15 | 16 |
|---|---|---|---|---|---|---|---|---|
| DOT MATRIX TABLE | 7 1/7 6 | 7 2/7 7 | 7 4/7 7 | 7 6/7 7 | 7 7/7 1 | 7 6/6 3 | 7 7/7 4 | 7 7/7 7 |

INK-JET PRINTING METHOD

BACKGROUND OF THE INVENTION

The present invention relates to an ink-jet printing method for painting an image on a recording medium with ink drops ejected from ink-jet heads and more particularly relates to an ink-jet printing method wherein the number of cells of a matrix for a single picture element can be varied.

In the case of painting an image with half-tones such as photographs by using an ink-jet printer, it is necessary to be able to express half-tones in at least about sixteen steps of gradations. An ink-jet printing method suitable for expressing half-tones is well known in this art wherein the number of ink dots and their locations to be deposited in a dot matrix having M possible positions on the rows and N possible positions on the columns (which together can be thought of as a cell) for a single picture element are changed in order to produce half-tones. The dot matrix for a single picture element includes a plurality of square cells on each of which a single ink drop is permitted to be deposited. When it is intended to reproduce an image the same as or proportional to an original, a dot matrix having the same number of possible positions on each of the rows and the columns, that is, in which M and N are numerically equal, is used.

An ink-jet printing method wherein a single dot matrix is allocated to respective picture elements allows painting an image with half-tones closely similar to an original and advantageously permits a memory for memorizing the image information to have a small capacity since a picture element to be produced or painted can be made of a large number of ink dots when using a large size of dot matrix having an increased number of cells therein. On the other hand, there is the disadvantage that the image painted will be lowered in resolution. On the contrary, when using a small size of dot matrix having cells reduced in number, the image painted will be improved in resolution since a single picture element is made of a small number of ink dots. However, there is then the disadvantage that the ability to paint an image with half-tones is reduced and a large-capacity memory for memorizing image information is necessary.

In a method which is conventionally employed in consideration of the facts described above, the size of a single dot matrix for a picture element is chosen in accordance with the subject matter so as to paint desirable images; for instance, a large size of dot matrix is chosen when it is necessary to reproduce an image with half-tones closely similar to those of photographs and a small size of dot matrix is chosen when it is necessary to paint characters and line drawings demanding great resolution. However, in an ink-jet printer wherein a recording paper wrapped around a rotary drum is rotated at a fixed speed and ink drops are deposited thereon under the control of signals synchronized with the rotation of the drum so as to paint picture elements one by one, there is the disadvantage that some ink-jet heads will be of no practical use when a small size of dot matrix is chosen in place of a large size of dot matrix, and that it takes a long time to paint a predetermined area.

OBJECTS OF THE INVENTION

The principal object of the present invention is to provide an ink-jet printing method wherein all of the ink-jet heads can be used efficiently irrespective of the size of dot matrix chosen.

Another object of the present invention is to provide an ink-jet printing method wherein the period of time required to paint a given area is kept constant irrespective of the size of dot matrix chosen.

SUMMARY OF THE INVENTION

These and other objects of the present invention are attained in conjunction with the present invention by using a head assembly in which a plurality of ink-jet heads are divided into several sub-groups of ink-jet heads in accordance with a size of a dot matrix to be chosen. An ink-jet printer embodying the present invention wherein it is possible to choose any one of several different sizes of dot matrices to be deposited with ink drops thereon has ink-jet heads as many as the least common multiple of the numbers of rows of dot matrices to be made available. For instance, ink-jet heads as many as the least common multiple of m and n are used when two dot matrices can be selectively used, one of which has m rows and k columns, namely an m×k dot matrix and the other has n rows and l columns, namely an n×l dot matrix. The ink-jet heads are so arranged that ink drops to be deposited on a recording paper thereby are separated by a distance equal to the size of a cell so as not to overlap one another. In the case of using an m×k dot matrix for a single picture element, the ink-jet heads are divided into several sub-groups or m number of ink-jet heads. On the other hand, the ink-jet heads are divided into several sub-groups of n number of ink-jet heads when using an n×l dot matrix for a single picture element.

A head assembly having several sub-groups of m number of ink-jet heads can paint simultaneously n scanning lines (picture element lines) comprising m dot lines so as to form a single picture element with k columns of ink dots on a single scanning line. A head assembly having several sub-groups of n number of ink-jet heads can paint simultaneously m scanning lines comprising n dot lines so as to form a single picture element with l columns of ink dots on a single scanning line. In the description above, k and l being integers depend on the number of ink drops to be ejected from a single ink-jet head and can be determined electrically and so irrespective of the number of ink-jet heads. Although a dot matrix in which m=k or a matrix in which n=l is generally used, a dot matrix in which m≠k or n≠l can be used in order to produce images intentionally enlarged lengthwise or crosswise.

For using selectively either a dot matrix having two cells on each of the rows and the columns, namely, a 2×2 dot matrix or a dot matrix having three cells on each of the rows and the columns, namely, a 2×2 dot matrix, a head assembly having six ink-jet heads should be used. In this case it is possible to use a 6×6 dot matrix. When it is desirable to use selectively either a 3×3 dot matrix or a 4×4 dot matrix, a head assembly having 12 ink-jet heads will be used. In this case it is further possible to use selectively either a 2×2 dot matrix or a 12×12 dot matrix.

BRIEF DESCRIPTION OF THE DRAWINGS

Other objects, advantages and features of novelty of the invention will be evident to those skilled in the art from a reading of the following specification with the accompanying drawings. These drawings show, for illustrative purpose only, preferred embodiments of the invention.

In the drawings:

FIG. 5 is a set of 3×3 dot matrix tables;

FIG. 7 is a set of 2×2 dot matrix tables.

DETAILED DESCRIPTION OF THE INVENTION

Figure 1:
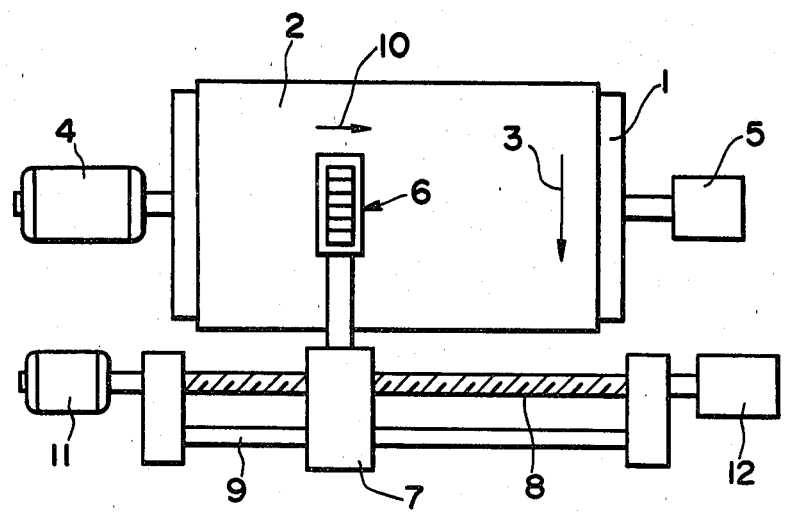
FIG. 1 is a schematic illustration of an ink-jet printer for practicing the method of the present invention.

Referring now in detail to the drawings, wherein like reference numerals denote the same or similar elements throughout the several views, in a preferred apparatus for practicing the method of the present invention, illustrated in FIG. 1, there is schematically shown an ink-jet printer, in which a rotary drum 1 having a recording paper 2 wrapped therearound is caused to rotate at a fixed speed in a primary scanning direction shown by an arrow 3, by a main pulse motor 4. The actual position of the rotary drum 1 undergoing rotation is, in the primary scanning direction, detected by a main rotary encoder 5 which is adapted to reset its contents every one revolution of the rotary drum 1.

Adjacent the rotary drum 1 is a head assembly 6 firmly attached to a movable table 7 which can be caused to move intermittently in a secondary scanning direction shown by arrow 10 by means of a feed screw shaft 8 and a rail 9. The rotated displacement of the feed screw shift 8 caused by means of a secondary scanning pulse motor 11 is detected by a secondary rotary encoder 12. Thus the moved position of the head assembly 6 relative to the recording paper 2 can be obtained by the rotary encoders 12. Furthermore, the secondary scanning pulse motor 11 is adapted to make one revolution each time the rotary drum 1 makes one revolution so as to advance intermittently the head assembly 6 in the secondary scanning direction shown by the arrow 10.

Figure 2:
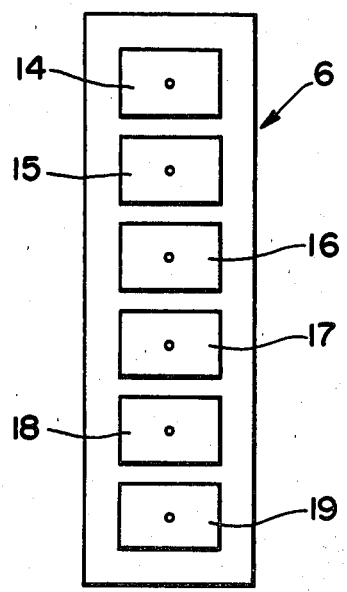
FIG. 2 is a front view showing a head assembly having six ink-jet heads.
Figure 3:
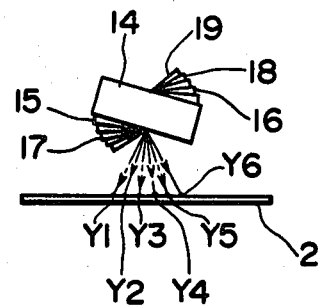
FIG. 3 is a schematic side elevational view showing a head assembly of FIG. 2 in a recording stage.

As shown in FIG. 2, there is illustrated a head assembly in which six ink-jet heads 14 to 19 are disposed in side-by-side arrangement in the primary scanning direction. It is possible to employ a drop-on-demand type of ink-jet head having a nozzle at its center from which an ink drop of a size corresponding to a voltage applied thereto is ejected.

Ink-jet heads 14 to 19 are directed in different directions so as to eject drops toward different positions with separation by a distance equal to the size of a single cell in the secondary scanning direction. That is to say, the foremost ink-jet head 14 is tilted so as to eject an ink drop toward the line Y1 extending in the primary scanning direction, and the second ink-jet head 15 is tilted less than the ink-jet head 14 so as to eject an ink drop toward the line Y2. In much the same way as the ink-jet heads 14 and 15, ink-jet heads 16, 17, 18 and 19 eject ink drops toward different lines Y3, Y4, Y5 and Y6, respectively.

Although the ink-jet heads are, for the purpose of easy adjustment, different from one another in the direction of ejection so as to deposit ink drops at different positions in this embodiment, it is possible to arrange ink-jet heads with separation by a distance equal to the size of a single cell in the secondary scanning direction as well as in the primary scanning direction. Applied to the respective ink-jet heads 14 to 19 in synchronization with the signals indicating the position of the rotary drum 1 detected by the main rotary encoder 5 are a series of painting signals, that is, a series of pulse signals, which are in the form of voltages corresponding to the size of the ink dots to be deposited. Since the ink-jet heads 14 to 19 are arranged with separation by a proper distance in the primary scanning direction due to the size or dimensions thereof, the series of painting signals is fed to the respective ink-jet heads 15 to 19 with delayed timing corresponding to the number of ink dots that can exist between the foremost ink-jet head 14 and the respective ink-jet heads 15 to 19 as compared with the series of painting signals fed to the foremost ink-jet head 14 so as to deposit ink drops in a desired position in the primary scanning direction.

Figure 4:
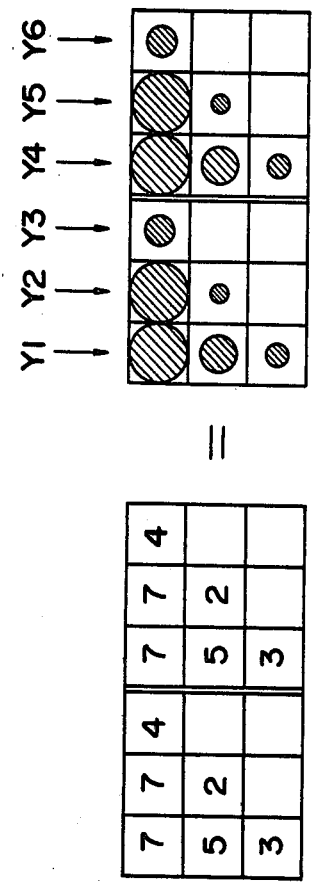
FIG. 4 is a schematic illustration of a dot matrix table and ink dots deposited on a 3×3 dot matrix for a single picture element.

FIG. 4 shows another embodiment wherein six ink-jet heads of a head assembly are divided into two sub-groups of three ink-jet heads each, so as to paint simultaneously two dot matrices each of which comprises three cells on each of the rows and the columns for a single picture element.

The chart shown in FIG. 4 represents the mutual relation between the size of ink dot to be deposited on a dot matrix and the voltage level of the painting signal by which an ink-jet head is actuated to eject an ink drop so as to deposit the predetermined size of ink dot. The voltage level and the dot size on the same location of matrices correspond to each other in the ratio of one to one. The grid shown in FIG. 4 indicates the positions in which ink drps are deposited and the double line, for illustrative purpose only, denotes the boundary between two picture elements. In this embodiment, the voltage levels applied to ink-jet heads are classified in seven steps, from the highest level "7" to the lowest level "1". At the highest level "7", an ink-jet head is permitted to eject a large ink drop to deposit the largest size of ink dot on the recording paper 2. On the other hand, the ink-jet head is, at the lowest level "1", permitted to eject only a small ink drop to deposit the smallest size of ink dot on the recording paper 2.

In several blank cells there is no ink dot deposited.

It is not always true that a linear relationship is established between voltage levels and voltage values to be applied or sizes of ink dot. Voltage values corresponding to voltage levels may be provided in consideration of the density characteristics of the inks to be used. Because a 3×3 dot matrix for a single picture element is a square with a side which is, for instance, 500 $\mu$m in length, the single cell is a square with a side 167 $\mu$m in length.

Figure 5:
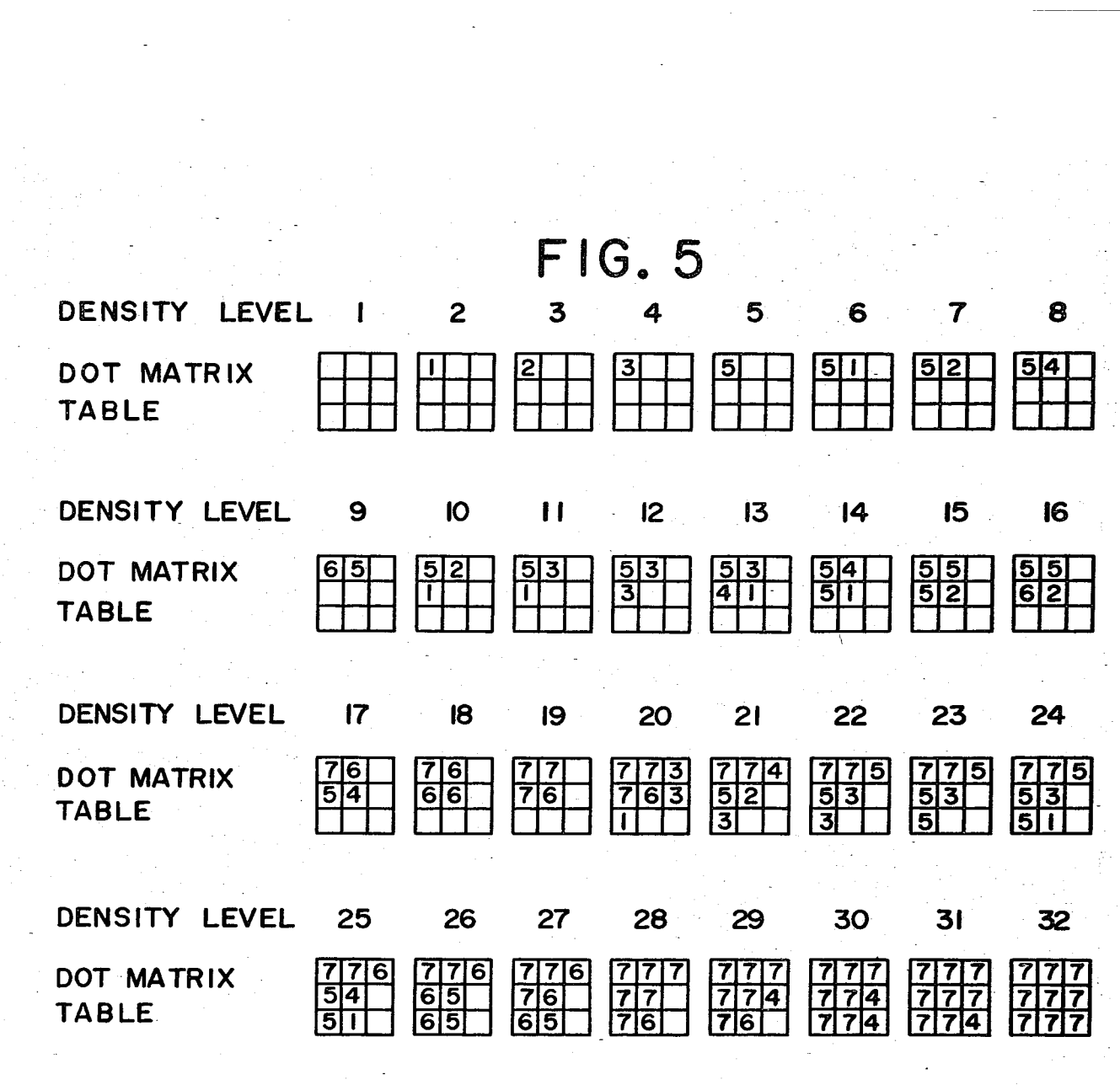

In the case of painting simultaneously two 3×3 dot matrices, the density level signals of the picture elements which are to be simultaneously painted on two scanning lines (picture element lines) are read out from an image information memory (not shown) and then converted into three series of painting signals for every scanning line with reference to the dot matrix tables shown in FIG. 5. That is to say, density signals are converted into three series of painting signals for one scanning line, and hence six series of painting signals for two scanning lines, and then stored in six buffer memories (not shown). The painting signals are simultaneously read out from the buffer memories in response to position signals from the main rotary encoder 5 when the rotary drum 1 makes one revolution and the head assembly 6 moves one step. These six series of painting signals are converted into voltage values, respectively, by head driving circuits (not shown) associated with each of the ink-jet heads and then modulated with carrier signals. The six series of painting signals (that is, the six series of pulse signals) in the form described above drive the ink-jet heads to paint simultaneously two scanning lines, one comprising three dot lines of Y1 to Y3, and the other comprising three dot lines of Y4 to Y6. After one revolution of the rotary drum 1, the head assembly 6 is caused to move by a distance equal to the width of two scanning lines, i.e., six cells, for instance about 1 mm, to paint simultaneously two scanning lines.

When painting the dot matrix shown in FIG. 4, the ink-jet head 14 is driven by application of voltages of levels "7", "5" and "3" in regular order to deposit three ink dots each of a size corresponding to the respective voltage level. The ink-jet head 15 is, with a certain time lag equal to the time required for the ink-jet head 15 to advance the distance between it and the previous ink-jet head 14, driven by voltages of levels "7" and "2" in regular order to deposit two ink dots, and then the ink-jet head 16 is, with a certain time lag behind the ink-jet head 15, driven by voltage of level "4" to deposit an ink dot. In the same manner as described for the ink-jet heads 14 to 16, the ink-jet heads 17 to 19 are driven to deposit ink dots of sizes corresponding to the respective levels of the applied voltage.

FIG. 5 shows dot matrix tables in which half-tones can be produced in 32 steps of gradations with the use of a 3×3 dot matrix. The dot matrix table having the density level of "21" in FIG. 5 is equivalent to that shown in FIG. 4. In the dot matrix having the density level "1", there is no ink dot to be deposited, and there is a single ink dot having a diameter of about 100 μm for a square picture element with a side 500 μm in length in the dot matrix having the density level "2"; while in a dot matrix having a high optical density such as the density level "32", the dot matrix with a side of 500 μm is filled with nine ink dots 180 μm in diameter in side-by-side arrangement.

Figure 6:
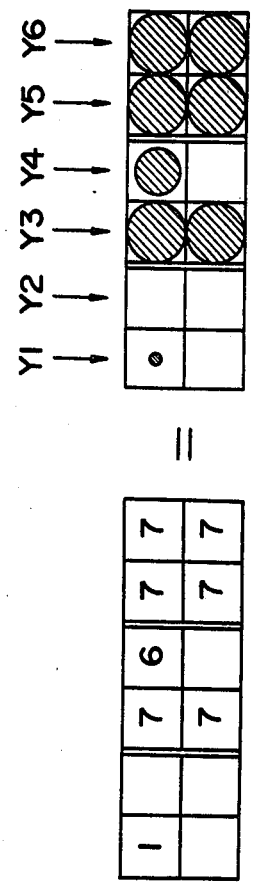
FIG. 6 is a schematic illustration of a dot matrix table and ink dots deposited on a 2×2 dot matrix for a single picture element.

FIG. 6 shows still another embodiment wherein six ink-jet heads of a head assembly are divided into three sub-groups of two ink-jet heads each, so as to print simultaneously three dot matrices or three picture elements each of which comprises two cells on each of the rows and the columns and has a side of 334 μm. The dot matrix described just above serves to reduce the graininess and improve the resolution of the image painted. Contrarywise, however, the steps of gradations in which half-tones can be produced are of necessity fewer than when using a 3×3 dot matrix. Therefore, the FIG. 6 arrangement is suitable for making images such as line drawings or other characters which demand resolution rather than gradations. The dot matrices shown in FIG. 6 are equivalent to dot matrix table density levels of "2", "12", and "16", respectively.

In the case of using of 2×2 dot matrix for a single picture element, the density level signals of picture elements which are to be painted on three scanning lines are read out from an image information memory (not shown) and then converted into two series of painting signals for every scanning line with reference to a dot matrix table. The six series of painting signals drive, in the same manner as described for a 3×3 dot matrix, ink-jet heads to eject ink drops and to then deposit ink dots.

FIG. 7 shows dot matrix tables with sixteen steps of gradations in which voltages to be applied to ink-jet heads are classified into seven steps or levels of voltages, i.e., the lowest level "1" to the highest level "7".

When using a head assembly having three ink-jet heads in place of a head assembly described above to paint selectively two types of dot matrices, that is, a 2×2 dot matrix and a 3×3 dot matrix, there are the disadvantages that the head assembly is not operated efficiently due to the fact that one of ink-jet heads will fall idle if a 2×2 dot matrix is chosen, and that the time required to paint an image of a certain size is approximately 1.5 times as much as the time required for a 3×3 dot matrix due to the width of painting for each revolution of a rotary drum, say, about 334 μm. In addition, there is the disadvantage that the pitch by which the head assembly will be moved intermittently should be varied according to the width of painting.

Although a drop-on-demand type of ink-jet head is employed in the embodiment described above, it should be understood that various types of ink-jet heads may be employed as desired. When it is desired to paint color images, it is enough to provide head assemblies equal in number to the number of different color inks to be used in side-by-side arrangement in the secondary scanning direction so as to deposit different colors of ink dots on a single dot matrix.

As many apparently widely different embodiments of this invention may be made without departing from the spirit and scope thereof, it is to be understood that the invention is not limited to the specific embodiments disclosed herein except as defined in the appended claims.

What is claimed is:

1. In a method for painting images with ink dots deposited on a recording medium by a plurality of ink-jet heads disposed close to said recording medium, wherein said recording medium moves in a primary scanning direction and said plurality of ink-jet heads move intermittently in a secondary scanning direction perpendicular to the primary scanning direction; the improvement comprising providing ink-jet heads equal in number to the least common multiple of arbitrary integers m and n; arranging said ink-jet heads in such manner that ink dots are deposited with separation by a distance equal to the size of a single cell of a dot matrix used in the secondary scanning direction; and dividing said ink-jet heads into a plurality of sub-groups of ink-jet heads, each sub-group containing a number of heads equal to a whole number factor of the number of possible dots in a said matrix, said whole number factor being greater than one.

2. A method as defined in claim 1, comprising using six ink-jet heads; and dividing said six ink-jet heads into three sub-groups of two ink-jet heads, thereby to provide a 2×2 dot matrix for a single picture element.

3. A method as defined in claim 1, comprising using six ink-jet heads; and dividing said six ink-jet heads into two sub-groups of three ink-jet heads, thereby to provide a 3×3 dot matrix for a single picture element.

4. A method as defined in claim 1, comprising using twelve ink-jet heads; and dividing said twelve ink-jet heads into sub-groups of ink-jet heads each having a number of heads equal to a whole number factor of twelve which is greater than one, thereby providing a dot matrix having that whole number factor of dots along each side.

5. A method as defined in claim 1, wherein said ink-jet heads are disposed in side-by-side arrangement in a line in the primary scanning direction and are directed toward the recording medium respectively in different directions that diverge from each other in the direction of the recording medium so as to eject ink drops toward different positions on the recording medium with separation by a distance equal to the size of a single cell in the secondary scanning direction.

* * * * *